Figures 1, 9:
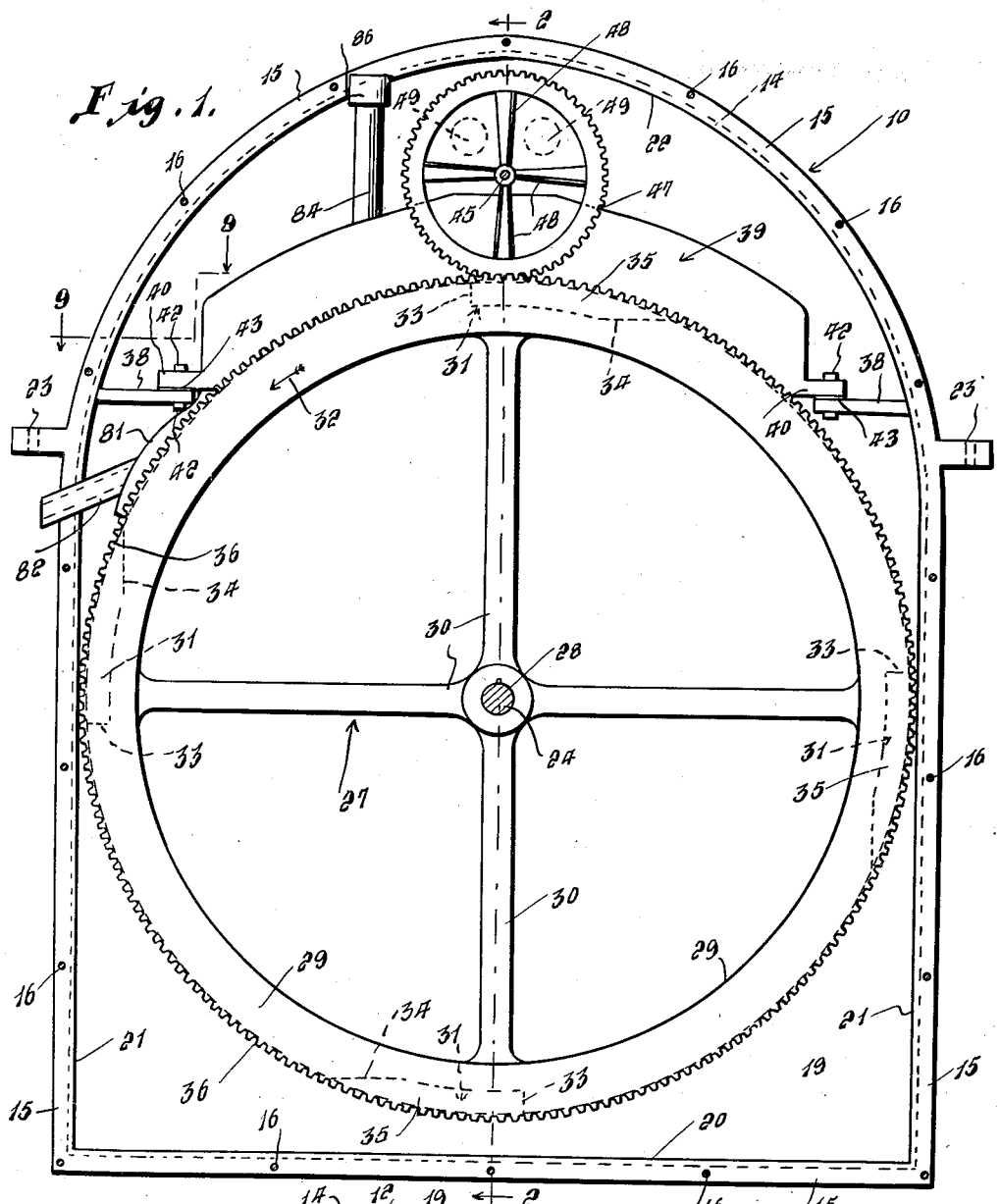

July 7, 1942.  G. A. DRAUCKER  2,289,106
ROTARY ENGINE
Filed May 22, 1941  3 Sheets-Sheet 1

Inventor
Garfield A. Draucker

July 7, 1942.  G. A. DRAUCKER  2,289,106
ROTARY ENGINE
Filed May 22, 1941  3 Sheets-Sheet 2
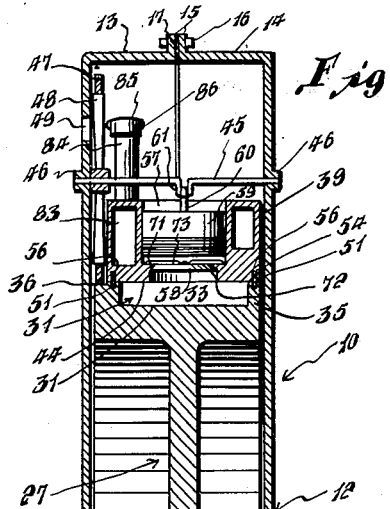
Inventor
Garfield A. Draucker
By
Attorney July 7, 1942.　　　　G. A. DRAUCKER　　　　2,289,106
ROTARY ENGINE
Filed May 22, 1941　　　　3 Sheets-Sheet 3
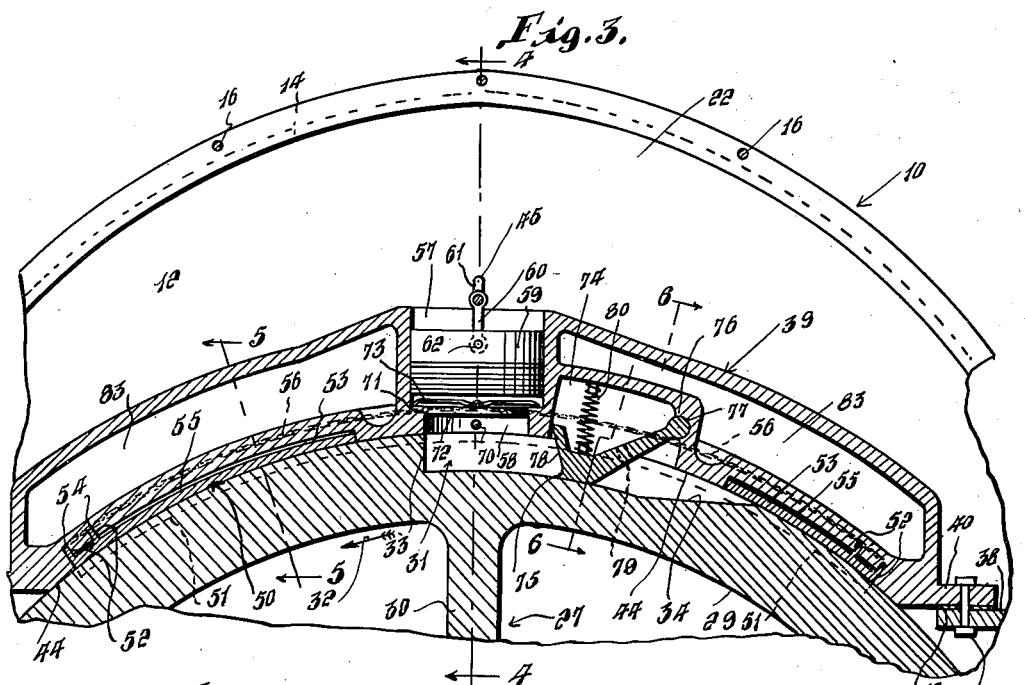
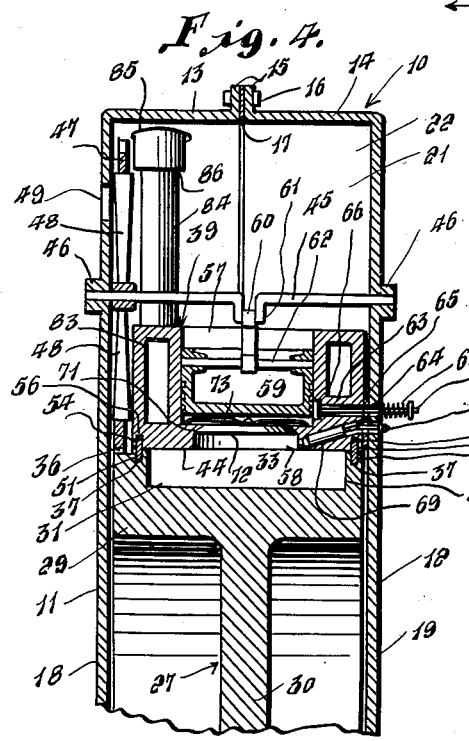
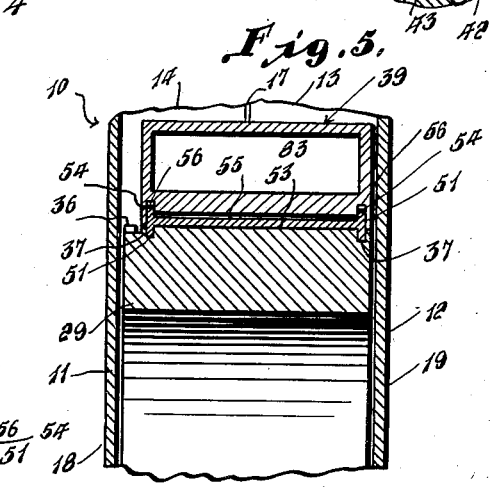
Inventor
Garfield A. Draucker
By L. F. Rudolph
Attorney Patented July 7, 1942

2,289,106

UNITED STATES PATENT OFFICE 2,289,106

ROTARY ENGINE

Garfield Arthur Draucker, Keystone, Nebr.

Application May 22, 1941, Serial No. 394,697

5 Claims. (Cl. 123—15)

This invention relates to an improved construction of rotary internal combustion engine, and more particularly to a rotary type engine of simple construction, composed of few parts, and which is so assembled that disassembling of the engine for repair or replacement of parts is greatly simplified.

Still another aim of the invention is to provide an engine which will be light in weight and which due to the fact that few parts are employed, will produce less friction in operation and thereby provide for increased operating efficiency.

Still another aim of the invention is to provide an engine having no main crankshaft and no exhaust valves and in which no cam shafts are required.

Still a further aim of the invention is to provide an engine requiring no lubricating system and in which the combustion chambers move through a lubricant after each firing operation and by means of which any burnt gases or carbon remaining in the combustion chambers, after the combustion gases have been exhausted, will be removed by the lubricant.

Still another aim of the invention is to provide an engine which may be employed as a stationary engine and which is provided with a combined air and water type cooling system.

Still another aim of the invention is to provide an engine employing only two valves regardless of the size of the engine or the number of combustion chambers with which it is equipped.

Still another aim of the invention is to provide a rotary type engine having any desired number of firing chambers all employing a single spark plug to thereby materially simplify the ignition system of the engine.

Other objects and advantages of the invention will hereinafter become more fully apparent from the following description of the drawings, which illustrate a preferred embodiment thereof, and wherein:

Figure 1 is a front elevational view of the engine with the front section of the casing removed, Figure 2 is a vertical sectional view of the same taken substantially along the plane of the line 2—2 of Figure 1, and showing the front section applied, Figure 3 is an enlarged fragmentary longitudinal sectional view, partly in elevation, of the upper portion of the engine, Figures 4, 5 and 6 are transverse sectional views of the upper portion of the engine taken substantially along the planes indicated by the lines 4—4, 5—5 and 6—6, respectively, of Figure 3, Figure 7 is a top plan view of the sealing member for sealing the space between the firing block and rotor, Figure 8 is a bottom plan view of the firing block and showing the sealing member applied thereto and illustrated in bottom plan, and Figure 9 is a detail sectional view taken substantially along the plane of the line 9—9 of Figure 1.

Referring more particularly to the drawings, wherein like reference characters designate like or corresponding parts throughout the different views, 10 designates generally a casing or housing of the engine which includes a front section 11 and a rear section 12. The sections 11 and 12 are provided with marginal flanges 13 and 14, respectively, which extend toward one another and which are provided with corresponding outwardly projecting flanged portions 15, which are adapted to be connected at spaced points by nut and bolt fastenings 16 for detachably connecting the sections 11 and 12 to form the casing or housing 10. The sections 11 and 12 are preferably provided with a gasket 17 which is disposed between the flanged portions 15 for sealing the casing 10. The casing 10 is provided with substantially flat, parallel front and rear walls 18 and 19, which form parts of the sections 11 and 12, respectively, and the flanged portions 13 and 14 combine to form a substantially flat bottom 20 and substantially flat sides 21, the lower portions of which are disposed substantially parallel. The upper portions of the sides 21 are arcuately shaped to form an arcuately shaped top portion 22 of the casing 10. The casing 10, beneath and adjacent its top portion 22, is provided with brackets 23 which project outwardly from the sides 21 and which are adapted to be attached to suitable supports, not shown, for mounting the engine by its casing 10.

A main driving shaft 24 extends transversely through the casing 10, and is journaled in antifriction bearings 25 which are disposed in alined bearing housings 26 which project outwardly from the front and rear walls 18 and 19, respectively. A rotor, designated generally 27, is mounted in the casing or housing 10, and is provided with a hub 28 which is keyed to the intermediate portion of the shaft 24. The periphery or rim 29 of the rotor 27 is connected to the hub 28 by a plurality of spokes 30, and the width of the hub 28 and periphery 29 is slightly less than the width of the housing 10 so that the sides of the periphery 29 and the ends of the hub 28 are spaced from the walls 18 and 19. As best seen in Figure 1, the rotor 27 extends substantially to the sides 21 and the bottom 20, but is spaced a substantial distance from the top portion 22 of the casing 10. In the embodiment of the invention as disclosed, the rim or periphery 29 is provided with four equally spaced pockets or combustion chambers 31, which open outwardly of the periphery 29 and which are elongated circumferentially thereof. The rotor 27 is adapted to revolve in the direction, as indicated by the arrows 32, in Figures 1 and 3, and the pockets or combustion chambers 31 are provided with radially disposed walls 33 at their leading ends, forming the surfaces against which the explosion charges are adapted to impinge, as will hereinafter become apparent, for driving the rotor 27 in a counterclockwise direction, as indicated by the arows 32. The opposite ends 34, forming the trailing ends of the pockets 31 are curved outwardly slightly toward the outer side of the rim 29, for a purpose which will hereinafter become apparent. As seen in Figure 4, the side walls 35, of the pockets 31, are substantially flat and substantially parallel.

As seen in Figure 4, the pockets 31 are offset slightly relatively to the plane of the center of the rotor 27 toward the side thereof which is adjacent the rear wall 19 and the outer side of the periphery 29 is provided with an annular toothed portion forming a gear 36 which is disposed adjacent the opposite side of the rotor 27 and adjacent the front wall 18, for a purpose which will hereinafter become apparent. Between the gear 36 and the pockets 31 and between the back side of the rotor and the pockets 31, the rim 29 is provided with corresponding annular outwardly opening grooves 37, for a purpose which will hereinafter be described.

Referring particularly to Figures 1, 3 and 9, the flange 14 is provided with inwardly projecting supporting brackets 38 which are disposed above and adjacent the supporting brackets 23 and which although supported entirely by the flange 14, as seen in Figure 9, extend from the front wall 18 to the rear wall 19, or from the front to the rear of the interior of the housing 10. A firing block or head, designated generally 39, is provided with outwardly projecting lugs 40 at its ends which rest on the supporting brackets 38 and which are attached thereto by fastenings 42 for detachably mounting the firing block 39 in the top portion of the housing 10 and above the upper portion of the rotor 27, as best seen in Figure 1. Shims 43 are preferably disposed between the supporting brackets 38 and the lugs 40 for adjustably positioning the firing block 39 relatively to the rim 29 of the rotor 27. As seen in Figures 1 and 3, the head or firing block 39 is bowed longitudinally to conform generally to the curvature of the rim 29 and its underside 44 is shaped to fit flush against the outer side of the rim 29. As best seen in Figures 2 and 4, the head 39 is offset slightly toward the rear wall 19 so that it extends to the rear side of the rim 29 and to adjacent the gear 36.

A crankshaft 45 extends transversely through the upper portion of the housing 10 and is journaled at its ends in bearings 46 formed on the outer sides of the walls 18 and 19. A gear 47 is keyed to the shaft 45 and is disposed between the front wall 18 and the head 39 and is enmeshed with the gear 36 to cause the shaft 45 to be revolved by the rotation of the rotor 27. The gear 47 is provided with propeller blades 48 which form the spokes of the gear and the front wall 18, adjacent the gear 47, is provided with openings 49 through which air can be drawn into the upper portion of the housing 10 by the blades 48 to be circulated around the firing block 39 and the portion of the rim 29 which is in engagement therewith. It will thus be seen that the blades 48 function as a fan to provide air cooling means for the engine.

Referring to Figure 7, 50 designates generally a sealing member the longitudinal edges of which are provided with strip portions 51. In Figure 7, the upper or inner side of the sealing member 50 is provided with transverse strip portions 52 which are disposed at the ends of the sealing member and which project upwardly from plates 53 which are disposed between the longitudinal strips 51, adjacent the ends of the sealing member 50. The underside 44 of the head 39 is provided with grooves 54 for receiving the upper portions of the strips 51 and the strips 52 and the face 44 is also recessed, adjacent its ends, as seen at 55, to provide seats for the plates 53, as best seen in Figure 3. The sealing member 50 is curved to conform to the curvature of the face 44 and its strips 51 are substantially wider than the strips 52 so that their lower edge portions project outwardly from the under or outer side of the plates 53, as best seen in Figure 5, for engaging the grooves 37. The portions of the grooves 54 which seat the strips 51 are provided with undulating springs 56 which urge the sealing member 50 toward the periphery 29 so that the strips 51 will be held in engagement with portions of the grooves 37 and the end plates 53 will be held in frictional engagement with portions of the periphery of the rotor.

Referring particularly to Figures 3 and 4, the firing block 39 is provided with a cylinder 57, intermediate of its ends, and which is disposed transversely thereof. The cylinder 57 opens outwardly of the outer, upper side of the block 39 and at its opposite end the cylinder 57 is provided with a restricted opening 58 which opens into the inner face 44. A piston 59 is reciprocably mounted in the cylinder 57 and is provided with a connecting rod 60 which projects from the outer side of the cylinder 57 and which is connected to the crank 61 of the crankshaft 45. The connecting rod 60 is connected to the piston 59 by a conventional wrist pin connection 62. As best seen in Figure 4, the block 39 is provided with a lateral passage 63, the inner end of which opens into the cylinder 57. The passage 63 alines with an opening 64 in the rear wall 19 and a gasket 65 is interposed between the rear wall 19 and the block 39, the bore of which combines with the opening 64 and the passage 63 to form a continuous passage from the cylinder 57 through the rear wall 19. The inner end of the passage 63 is enlarged to form a valve seat 66 for a valve 67, the head of which is disposed therein and the stem of which extends outwardly through the opening 64. The outer end of the stem of the valve 67 projects outwardly from the rear wall 19 and is provided with an expansion spring 68 for urging the valve 67 outwardly and to a closed position. The passage 63, the opening 64 and the gasket 65 combine to form an intake port for carbureted fuel which is adapted to be supplied from a carbureter, not shown, in any conventional manner. Below the intake port, a port 69 is provided which opens into the restricted end 58 of the cylinder 57 and which opens outwardly of the rear wall 19 and which is adapted to contain a spark plug 70.

The upper portion of the restricted end 58 is tapered to form a valve seat 71 for a downwardly opening valve 72 which is provided with a spring 73, which seats in the enlarged lower end of the cylinder 57 for normally urging the valve 72 upwardly and into a closed position.

Referring to Figure 3, the underside 44, between the cylinder 57 and the recess 55 which is adjacent the entrance end of the firing block 39, is provided with a recess 74 to receive an elongated abutment member 75. The abutment member 75 is elongated and is provided at the end, which is remote to the cylinder 57 with an enlargement 76 which is arcuately shaped in cross section for engaging a similarly shaped recess 77 in one end of the recess 74 for pivotally mounting the abutment member 75. The abutment member 75 is provided at its opposite end with an upwardly extending wall portion 78, the lower part of which is rearwardly inclined, and is provided intermediate of its ends with openings 79. An expansion coil spring 80 is disposed in the recess 74 for urging the free end of the abutment member 75 outwardly and downwardly relatively to the recess 74 and the openings 79 are provided for the escape of air from the recess 74 as the abutment member 75 is swung inwardly thereof.

As seen in Figure 1, a jacket 81 extends from the exit end of the firing block and engages against a portion of the periphery of the rotor 27 and is provided with an exhaust pipe 82 which projects therefrom through one of the sides 21.

The remaining portions of the firing block or head 39 are made hollow to form a water jacket 83 which surrounds the various parts of the head 39, previously described, and which is provided with an upwardly extending filling neck 84 which terminates adjacent an opening 85 in the flange 13. A cap 86 is insertable through the opening 85 and detachably connected to the upper end of the neck 84 for closing the neck 84 and for substantially closing the opening 85. The jacket 83 is adapted to be filled with water for cooling the head 39 and the portion of the rotor which is in engagement therewith, in cooperation with the air cooling means previously described.

As previously stated, the lower portion of the housing or casing 10 is adapted to contain a lubricating oil. As the rotor 27 is shown provided with four equally spaced pockets or combustion chambers 31, the gear 47 is made one fourth the diameter of the rotor 27 so that gear 47 will make four revolutions to each revolution of the rotor. The gears 36 and 47 are so timed that when each of the pockets 31 reach the position of the pocket 31, illustrated in Figure 3, beneath the restricted open end 58 of the cylinder 57 and with the leading end 33 of the pocket substantially in a line with the portion of the opening 58, which is remote to the abutment 75, the piston 59 will be in a fully lowered position and by means of a suitable ignition system, not shown, connected to the spark plug 70 a spark will occur at this time to fire the compressed fuel mixture which is in the pocket 31, shown in Figure 3, and between its leading end wall 33 and the free end 78 of the abutment 75. As illustrated in Figure 6, the abutment 75 extends entirely across the pocket 31 for separating its leading end from its trailing end and as the explosion impinging against the face 78 cannot cause any movement of the abutment 75 and as the valve 72 is in a closed position the force of the explosion impinging against the leading wall 33 will cause the rotor to turn in a counterclockwise direction, as indicated by the arrow 32. Likewise, it will readily be apparent that the sealing member 50 will prevent any escape of the expanding gases between the outer face of the rim 29 and the surface 44 as the pocket in which the explosion is occurring is arranged between the end plates 53 and the longitudinal strips 51. As the rotor is driven in a counterclockwise direction, the trailing end 34 of the pocket 31 will engage the lower portion of the abutment 75 to swing it upwardly and into the recess 74 where it will be held by the periphery of the rim 29. As the pocket, shown in Figure 3, passes beyond the exit end of the firing block 39 the exhaust gases will be released into the jacket 81 and will freely escape through the exhaust pipe 82. The force of the explosion is ample to drive the rotor more than a quarter of a revolution so that the upwardly moving pocket 31, next behind the pocket in which the explosion has just occurred, will move under the firing block 39 and as its leading end 33 passes the free end of the abutment 75 said abutment will be forced downwardly by the spring 80 into the pocket. During this rotation of the rotor 27 through an arc of 90 degrees the gear 47 will be making one complete revolution, and during the first half of its revolution the piston 59 will be drawn upwardly and as the valve 72 is in a closed position and so held by its spring 73, as the piston 59 moves upwardly a vacuum will be created in the cylinder 57 below the piston to thereby cause the valve 67 to open inwardly to admit a charge of admixed fuel. At approximately the time that the next pocket or combustion chamber 31 in which an explosion is to occur, moves into engagement with the exit end of the firing block 39, the piston 59 begins its down or compression stroke to compress the fuel mixture which was drawn in on its up or intake stroke. The compression in the cylinder 57 caused by the down-stroke of the piston 59 will cause the valve 72 to open downwardly but the periphery of the rim 39 will seal the lower end of the restricted opening 58 to keep the fuel compressed while the piston 59 is completing its downstroke and until the leading end 33 of the pocket which is approaching the piston 59 has passed under the abutment 75 to allow it to drop to the position, as seen in Figure 3. As the leading end 33 of the pocket, after passing the abutment 75 moves into communication with the opening 58 the charge of the compressed fuel is released into the pocket and continues to be compressed by the piston 59 moving downwardly until the pocket 31 has reached the position, as seen in Figure 3, at which time the piston 59 will have reached a fully lowered position. At this time the spring 73 will return the valve 72 to a closed position due to the fact that there is no further pressure exerted on the valve 72 by the piston 59, and at the instant that the valve 72 moves to a closed position the spark plug 70 is energized to explode the charge within the pocket 31 which is in a firing position to repeat the operation previously described. The valve 72 is provided in order to prevent the expansion of the charge back into the cylinder 57 which would otherwise tend to force the piston 59 upwardly. It will be obvious that while the engine is in operation the blades 48 will circulate air around the firing head 39 and around the portion of the rotor which is in engagement therewith.

The main drive shaft 24 which is keyed to and rotated by the rotation of the rotor 27 may obviously be connected to any suitable machinery or other parts to be driven by the motor and if desired a plurality of the motors could be attached to a single elongated driving shaft 24, as for example where an unusual heavy load was to be driven which would be too great for efficient operation of a single motor of a particular size.

It will also be obvious that the rotor 27 could be provided with a single pocket 31 in which case the diameter of the rotor and the gear 47 would be the same or the rotor could be provided with two or three pockets or a number in excess of the four pockets as illustrated, and in each instance the diameter of the rotor would equal the diameter of the gear 47 multiplied by the number of pockets 31 with which the rotor was provided.

Various modifications and changes are contemplated and may obviously be resorted to as only a preferred embodiment of the invention has been disclosed.

I claim as my invention:

1. An internal combustion engine comprising a rotor, a driven shaft keyed to said rotor, said rotor being provided with a pocket opening outwardly of its periphery, a firing block having an arcuately shaped inner side for engaging a portion of the periphery of the rotor, means actuated by the rotor for drawing a charge of fuel into the block, compressing the fuel and injecting it into the pocket, means for igniting the charge of fuel in the rotor pocket, an abutment member connected to the block and movable into said pocket for forming a fixed abutment for the compressed charge of fuel, a casing formed of sections in which said rotor is rotatably mounted, the driven shaft of said rotor extending through the walls of said casing and being journaled therein, and means for adjustably and detachably mounting said firing block in the casing for adjustably positioning the firing block relatively to the periphery of the rotor.

2. An internal combustion engine comprising a rotor, a driven shaft keyed to said rotor, said rotor being provided with a pocket opening outwardly of its periphery, a firing block having an arcuately shaped inner side for engaging a portion of the periphery of the rotor, means actuated by the rotor for drawing a charge of fuel into the block, compressing the fuel and injecting it into the pocket, means for igniting the charge of fuel in the rotor pocket, an abutment member connected to the block and movable into said pocket for forming a fixed abutment for the compressed charge of fuel, a casing in which said rotor is rotatably mounted and in which the driven shaft thereof is journaled, said casing having openings in the upper portion thereof and above the firing block, and a fan connected to said first mentioned means and driven thereby, said fan being disposed adjacent the openings in the casing for circulating air around the firing block and rotor.

3. An internal combustion engine comprising a rotor, a driven shaft keyed to said rotor, said rotor being provided with a pocket opening outwardly of its periphery, a firing block having an arcuately shaped inner side for engaging a portion of the periphery of the rotor, means actuated by the rotor for drawing a charge of fuel into the block, compressing the fuel and injecting it into the pocket, means for igniting the charge of fuel in the rotor pocket, an abutment member connected to the block and movable into said pocket for forming a fixed abutment for the compressed charge of fuel, a casing formed of sections in which said rotor is mounted and in which the driven shaft of the rotor is journaled, said casing sections being removably connected, and means for detachably and adjustably mounting the firing block on one of said sections.

4. An internal combustion engine comprising a rotor, a driven shaft keyed to said rotor, said rotor being provided with a pocket opening outwardly of its periphery, a firing block having an arcuately shaped inner side for engaging a portion of the periphery of the rotor, means actuated by the rotor for drawing a charge of fuel into the block, compressing the fuel and injecting it into the pocket, means for igniting the charge of fuel in the rotor pocket, an abutment member connected to the block and movable into said pocket for forming a fixed abutment for the compressed charge of fuel, a casing formed of sections in which said rotor is mounted and in which the driven shaft of the rotor is journaled, said casing sections being removably connected, means for detachably and adjustably mounting the firing block on one of said sections, and the lower portion of said casing being adapted to contain oil into which the lower portion of the rotor extends.

5. An internal combustion engine comprising a rotor, a driven shaft keyed to said rotor, a casing in which the shaft is journaled and in which the rotor is mounted to revolve, said rotor having circumferentially spaced pockets opening outwardly of its periphery, said pockets being spaced from the sides of the rotor, a firing block mounted in the casing and having an arcuately shaped inner side for engaging a portion of the periphery of the rotor, means actuated by the rotor for drawing a charge of fuel into the firing block and for compressing the fuel and injecting it into the pockets while the pockets are in engagement with the block, means for igniting the charge of fuel, an abutment member connected to the block and movable into said pockets for forming a fixed abutment for the compressed charge of fuel, plates seated in the ends of the inner side of the firing block, sealing strips seated in the inner side of the firing block and extending longitudinally thereof, adjacent the side edges of the firing block to adjacent the ends thereof, said strips and plates being connected, said rotor being provided with circumferential grooves in the periphery thereof between which said pockets are disposed, said grooves being arranged for engaging said strips and spring means for urging the strips and plates toward the periphery of the rotor.

GARFIELD A. DRAUCKER.